June 6, 1961  G. V. JEFFERSON ET AL  2,987,613
VEHICLE WEIGHT RESPONSIVE MEANS
Filed Sept. 16, 1957  2 Sheets-Sheet 1

INVENTORS.
Glen V. Jefferson and
Rankin J. Bush
BY
W. L. Stout
THEIR ATTORNEY

June 6, 1961 G. V. JEFFERSON ET AL 2,987,613
VEHICLE WEIGHT RESPONSIVE MEANS
Filed Sept. 16, 1957 2 Sheets-Sheet 2

INVENTORS.
Glen V. Jefferson and
Rankin J. Bush
BY
W. L. Stout
THEIR ATTORNEY

United States Patent Office

2,987,613
VEHICLE WEIGHT RESPONSIVE MEANS
Glen V. Jefferson, Edgewood, and Rankin J. Bush, Jeanette, Pa., assignors to Westinghouse Air Brake Company, Wilmerding, Pa., a corporation of Pennsylvania
Filed Sept. 16, 1957, Ser. No. 684,180
1 Claim. (Cl. 246—251)

Our invention relates to a weight responsive means, and particularly to an improved weight responsive rail contactor secured to a railway track rail, or the like, having a slot formed directly under the head of the rail, the contactor being responsive to a deflection of the railhead caused by a car wheel passing over the slot.

In classification yards the need has arisen for a quick acting weight responsive rail contactor that will weigh a single wheel passing over a desired location without other wheels affecting the response. A contactor, of the class herein described, may be used in cooperation with automatically controlled retarders, so that the speed of a given railroad car can be controlled in proportion to its weight. An example of apparatus suitable for performing this function is described and claimed in the copending application for Letters Patent of the United States, Serial No. 473,819, filed on December 8, 1954 by E. C. Falkowski, for Car Retarder Speed Control Apparatus, now U.S. Letters Patent 2,819,682 granted January 14, 1958, and assigned to the assignee of the present application. Retarders of the type described in the aforesaid copending patent application, establish an initial retarder shoe pressure according to the weight per wheel of a passing car. Therefore a lightly loaded car should receive a low initial retarder pressure, while a heavily loaded car should receive a high initial retarder pressure.

In certain forms of weight measuring devices previously used, the deflection of the entire rail between two supports was measured and translated into weight readings. This arrangement has the disadvantage that it requires very rigid supports and rigid rail anchoring means. Other types of weight measuring devices used have required entire rail sections to be supported on scales, or have required a portion of the railhead to be cut away to provide clearance for a weight responsive lever. The supporting of an entire rail section on scales requires an installation that is expensive to make and maintain; and the cutting away of a portion of the railhead is objectionable due to the resulting break in the wheel rolling surface.

In a device of the class described, it would be desirable to reduce railway track rail unit stress, and to minimize the effect of shock, vibration, and weather conditions on the operation of such a device, all of which would tend to reduce maintenance and to increase the accuracy of operation.

It is therefore an object of our invention to provide a novel weight measuring device having low installation and maintenance costs. Another object of our invention is to provide a novel weight measuring device capable of operation under all weather conditions.

Another object of our invention is to provide a novel weight measuring device, the accuracy of which is not affected by shock and vibration encountered in railway service.

Another object of our invention is to provide a totally enclosed weight responsive rail contactor that is capable of operation, when secured to a slotted rail member, by car wheels passing over the railhead above the slot.

Other objects, purposes and features of our present invention will be in part obvious from the accompanying drawings and in part pointed out as the description of the invention progresses.

In practicing our invention in accordance with one embodiment thereof, we provide a rail member, substantially rectangular in cross section, having an elongated slot whose major axis runs parallel to an upper surface of the rail member. Secured to one side of the rail member is a contactor assembly operatively connected to a lever actuated by the deflection of the portion of the rail above the slot, hereafter referred to as the railhead, the deflection being transmitted to the lever by a pin in contact with the upper surface of the slot. The pin is housed in a stop member located within the slot. The stop member is secured within the slot by means of retaining members secured to the rail to form a weather tight seal. In practice, deflection of the railhead toward the lower surface of the slot will cause operation of the contact assembly contacts. Such a contactor may be used, for example, to provide information for use in automatically controlling the braking action of a railway car in accordance with the weight of the car. The provision of a contactor assembly secured to a rail member in the manner indicated eliminates the need for special and expensive rail supports. Further, the disclosed contactor assembly is made sensitive to a minute deflection of its associated railhead by means of a plurality of levers which also set up opposing and equal forces to reduce the effect of shock and vibration.

In the preferred embodiment of our invention, the slotted rail member is substantially rectangular in shape with a substantially rectangular constant cross section, the upper surface being slightly rounded as shown so as to conform with the shape of the head of the portion of a standard rail on either side of the rail member. However, any other form of rail member may be employed within the scope of our invention. Further, our invention is not to be restricted to a rail member, but is applicable, in its broader aspects, to any beam adapted to be deflected by a load.

In describing our invention in detail, reference will be made to the accompanying drawings, in which corresponding parts are generally identified by corresponding reference characters and in which.

Figure 1:
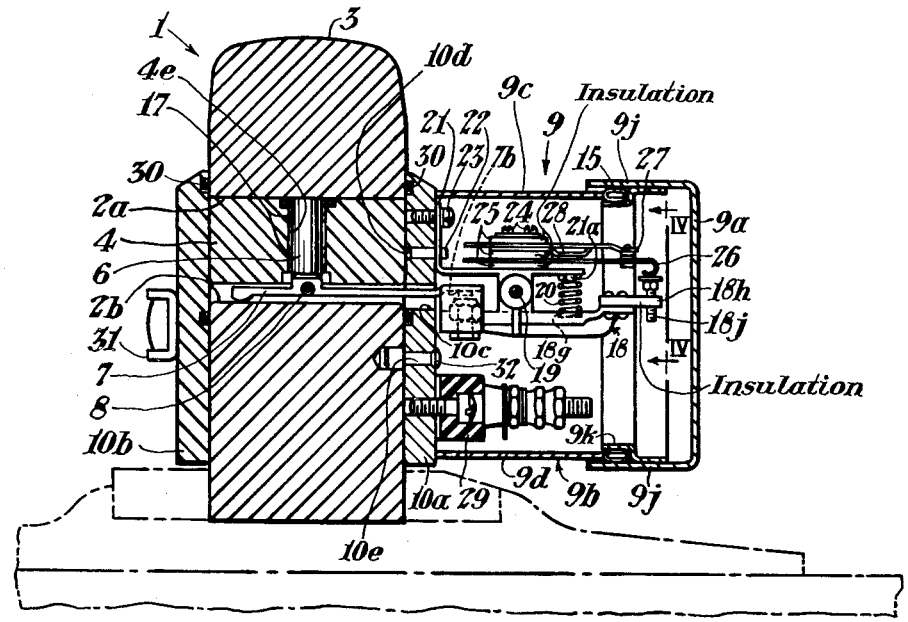
FIGURE 1 is a vertical cross sectional view taken along the line I—I in FIGURE 2, and showing one form of a weight responsive device embodying our invention.
Figure 3A:
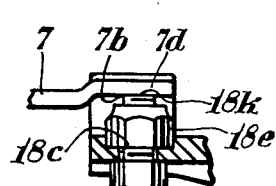
FIGURE 3a is a detailed view showing a means for adjusting a contact point between the levers shown in FIGURE 3.
Figure 3:
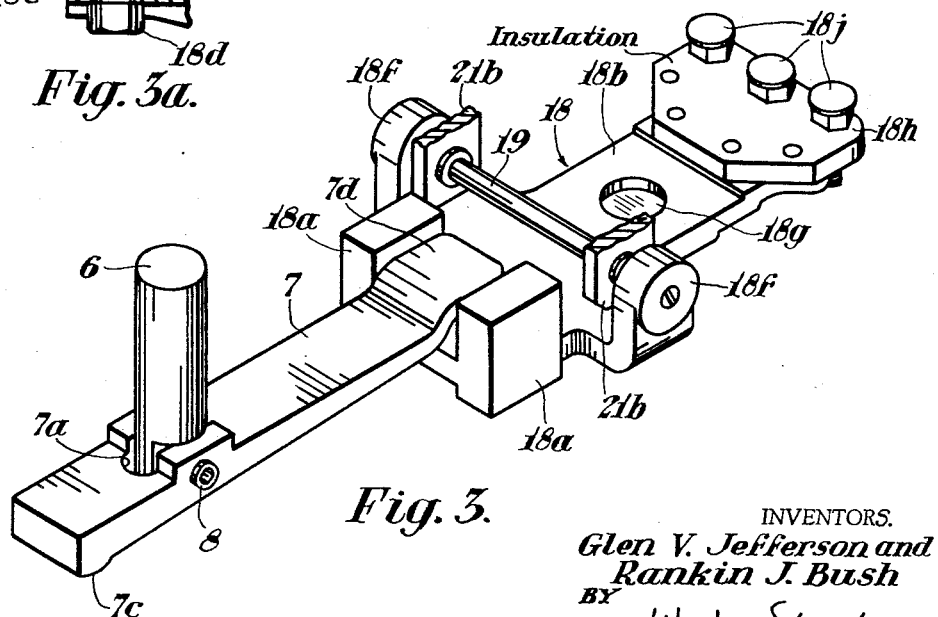
FIGURE 3 is an enlarged perspective view showing cooperating levers which transmit railhead deflections.
Figure 2:
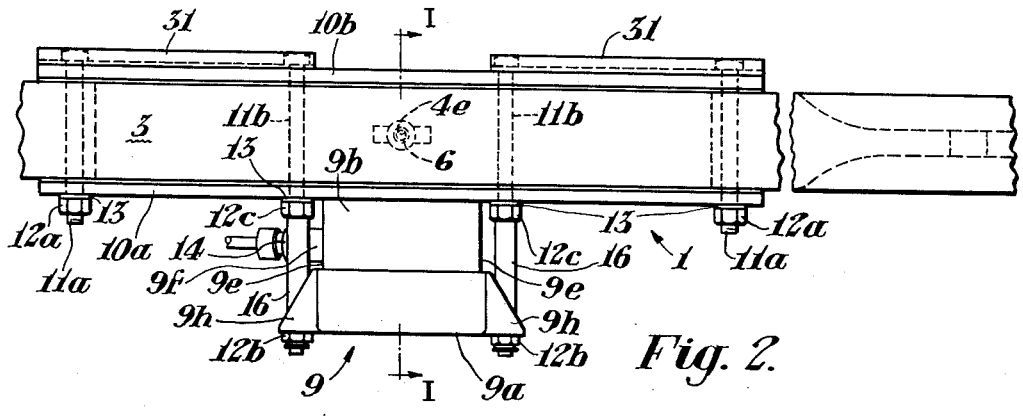
FIGURE 2 is a top plan view of the weight responsive device shown in FIGURE 1.
Figure 5:
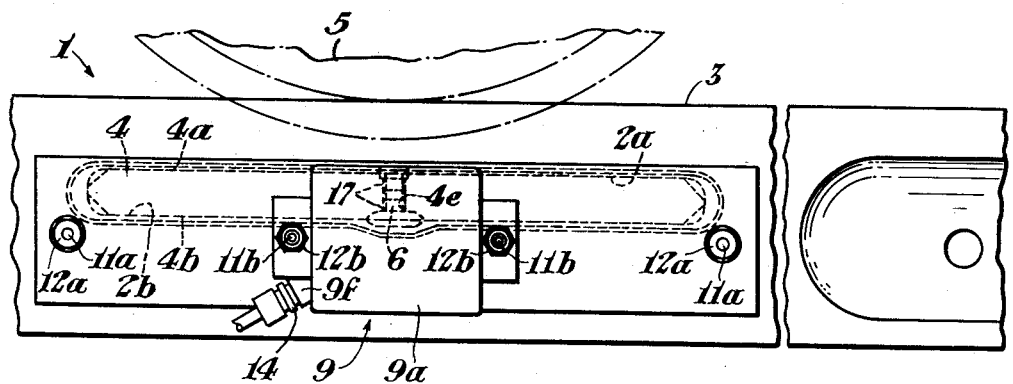
FIGURE 5 is a side elevational view of the device shown in FIGURE 1, with certain parts of the controller removed and other parts shown in dotted lines.
Figure 5A:
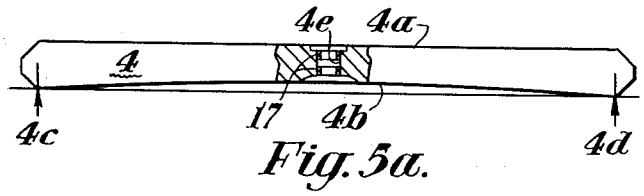
FIGURE 5a is a diagrammatic sketch of a stop member shown in FIGURES 1 and 5, in which the curvature of a concave surface of the member is exaggerated.

Referring to FIGURES 1 and 5, the reference character 1 designates a weigh rail provided with an elongated slot having an upper surface 2a and a lower surface 2b formed along the major axis of rail 1 parallel to railhead 3, so that the slot permits a portion of railhead 3 above the slot to function as a beam under a wheel load. A stop 4 is fitted into the slot substantially filling the slot. The stop member 4 has a substantially plane upper surface 4a engaging upper surface 2a of the slot and a concave lower surface 4b, as diagrammatically shown in FIGURE 5a, so that only the ends of lower surface 4b, at 4c and 4d as shown in FIGURE 5a, are in contact with lower surface 2b of the slot under no load conditions. The stop 4 is provided to limit deflection of railhead 3 into the slot, due to the load of a typical wheel 5, as shown in FIGURE 5, to an amount not exceeding the elastic limit of railhead 3. The concave lower surface 4b of stop 4 enables the stop to deflect with railhead 3 permitting stop 4 to receive a part of the load due to wheel 5 thereby reducing the total stress on railhead 3. The stop thereafter acts as a leaf spring whose form is changed by the application of an external force and the stop, therefore, helps the railhead 3 to return to its normal undeflected position once the weight of a wheel load is removed. The stop 4 is provided with an aperture 4e, as shown in FIGURES 1, 2, and 5 to accept a pin 6 (seee FIGURES 1 and 3) pivotally connected to a primary lever 7. As best shown in FIGURE 3, primary lever 7 is provided with an aperture 7a to accept pin 6, which is pivotally mounted in the aperture 7a by means such as a pin 8 secured to lever 7, as shown. According to this embodiment of our invention, pin 6 is in contact with upper surface 2a of the slot, and under a typical wheel load, pin 6 transmits a railhead deflection to primary lever 7, which in turn transmits the deflection to a contact assembly 9, or the like. The contact assembly 9 is secured to the outside surface of a sealing plate 10a and positioned so as to provide contact between secondary lever assembly 18, to be described, and primary lever 7 at 18k and 7b (see FIGURES 1 and 3a).

Referring now to FIGURE 1, sealing plate 10a, in addition to securing assembly 9 to rail 1, cooperates with a second sealing plate 10b to seal stop 4 within the slot. Plates 10a and 10b are secured together, as by bolts 11a and 11b, which are provided with nuts 12a, 12b, and 12c and lock washers 13.

Referring to FIGURES 1 and 2, contact assembly 9, according to this embodiment of our invention, is provided with a removable cover 9a, making the contacts of the assembly readily accessible.

The assembly 9 further comprises a case 9b, box-like in construction, having a top 9c, bottom 9d, and sides 9e. The case 9b is secured to sealing plate 10a, at the inner edges of top 9c, bottom 9d, and sides 9e, by any convenient means, for example, by welding. As shown in FIGURE 2, a boss 9f is secured to side 9e and apertured to receive a weather-tight connection 14 for securing and sealing a cable in place.

As shown in FIGURES 1 and 2, assembly cover 9a, also box-like in construction, is provided with a sealing gasket 15 adjacent its outer edges and securing lugs 9h on each side 9j. The parts are so proportioned that when cover 9a is in place, sealing gaskets 15 cooperate with the outer edges of case top 9c, bottom 9d, and side 9e, to seal case 9b against the entrance of moisture, dirt, or the like.

As shown in FIGURE 2, bolts 11b which secure sealing plates 10a and 10b to weigh rail 1, also receive cover lugs 9h for holding cover 9a tightly in place. This arrangement allows a rapid and simple installation of the device.

As shown in FIGURE 1, gaskets 15 are secured within cover 9a by flanges 9k secured to side 9j and forming a slot with outer edge of 9j. As shown in FIGURE 2, uniform gasket loading between case 9b and cover 9a is made possible by means of space collars 16, so that cover 9a can be tightened uniformly to case 9b by use of bolts 11b.

Referring now to FIGURES 1 and 3, pin 6, in contact with upper surface 2a, is located within aperture 4e in stop 4. Bushings 17 situated at top and bottom of aperture 4e guide pin 6. As previously described, pin 6 is pivotally secured to primary lever 7 by means of pin 8, such that primary lever 7 may pivot about the axis of pin 8. One end 7c of primary lever 7 rests against lower surface 2b of the slot, and the opposite end 7d extends through an aperture 10c in sealing plate 10a, to make contact with a secondary lever system 18, located within assembly 9, at 18k. The secondary lever system 18 comprises counterweights 18a, located at one end of support arm 18b, which cooperate with primary lever 7 to provide a balancing force between primary lever 7 and secondary lever system 18 thereby tending to eliminate the effect of shock and vibration on weigh rail 1. At the same end, between counterweights 18a, is located an aperture 18c (FIGURE 3a) which accepts a screw 18d which is threaded to cooperate with a nut 18e to form an adjustable device, as shown by FIGURE 3a. If manufacturing tolerances are exceeded in constructing the device, adjustment can be made to screw 18d to provide operating contact at 7b and 18k. In front of counterweights 18a are located lugs 18f which extend upward from support arm 18b to retain pin 19, such that secondary lever system 18 may pivot about the axis of pin 19. A biasing spring 20 (FIGURE 1) secured between a recess 18g on support arm 18b, and a projection 21a of L-shaped support 21, exert a downward force on support arm 18b, causing secondary lever system 18 to rotate about pin 19 and exert an upward force at 18k upon primary lever 7 at 7b. The force exerted at 18k is directed back through primary lever 7 at 7b whereby end 7c of primary lever 7 engages lower surface 2b of the slot. At the front of support arm 18b is fastened an insulating plate 18h to which are secured a plurality of movable contacts 18j, which are threaded as shown to permit adjustment to different contacting positions.

Figure 4:
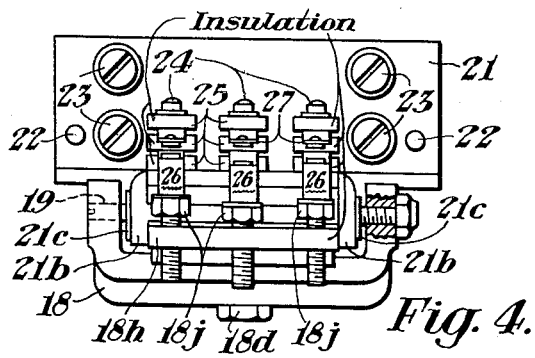
FIGURE 4 is a vertical cross sectional view taken along the line IV—IV in FIGURE 1.

As shown in FIGURES 1, 3 and 4, L-shaped support 21 is aligned with sealing plate 10a by dowel pins 22 and secured by screws 23 to sealing plate 10a. The L-shaped support 21 has downwardly extending lugs 21b containing bushings 21c which accept pin 19 which is secured by lugs 18f to secondary lever system 18, thereby positioning secondary lever 18 within assembly 9.

Secured to L-shaped support 21 by screws 24 are insulating blocks 25 which support a plurality of heel springs 26 positioned to make contact with plurality of movable contacts 18j. The insulation blocks 25 also secure a plurality of fixed contacts 27, positioned by upward biasing arms 28, also secured to insulating blocks 25.

Referring to FIGURE 4, the plurality of movable and fixed contacts are initially positioned with relation to each other during assembly by introducing shims, not shown herein, of varying thicknesses between heel springs 26 and movable contacts 18j, then adjusting movable contacts 18j until contact is made between heel springs 26 and fixed contacts 27. With the contacts adjusted as shown in FIGURE 4 a small railhead deflection will cause the left hand contacts to close, a somewhat greater deflection will cause the right hand contacts to close and a still greater deflection will cause a center set of contacts to close.

Electrical connections from fixed contacts 27, not shown, may be made by flexible leads connected to terminal block 29, which is secured to sealing plate 10a by any conventional means, such as the screw shown. An external electrical connection is then made through weather-tight connection 14 to terminal block 29.

Referring now to FIGURES 1 and 5, the combination of weigh rail 1 and assembly 9 is sealed against the entrance of moisture and foreign matter by sealing plates 10a and 10b. A surface of each sealing plate has annular grooves surrounding the slot to accept O rings 30, of a suitable diameter, so that when sealing plates 10a and 10b are secured to weigh rail 1, O rings 30 are under compression which results in a rolling seal when railhead 3 is deflected.

Apertures are provided in sealing plates 10a and 10b to accept bolts 11a and 11b which cooperate with nuts 12a, 12b, and 12c and lock washers 13 to secure sealing plates 10a and 10b to weigh rail 1. Stop plates 31 adjacent sealing plate 10b, are used to lock bolts 11a and 11b.

As shown in FIGURE 1, sealing plate 10a is apertured at 10c to provide ingress for primary lever 7; apertured at 10d to accept dowel pins 22 to position L-shaped support arm; and apertured at 10e to accept pin 32 which aligns assembly 9 and sealing plate 10b to weigh rail 1.

In accordance with the construction above described, a deflection at railhead 3 is transmitted through pin 6 to primary lever 7, and is then superimposed on secondary lever system 18 and transmitted to fixed contacts 27. With this construction, a deflection at railhead 3 can be amplified to any desired amount by selecting the lengths of levers, points of fulcrum, and the axes about which the levers rotate. It then follows, that the magnitude of an error in positioning contacts in our device can be appreciably reduced so that its effect on a final weight reading will be negligible. For example, in one embodiment of our invention, we use a primary lever with a length of 1.0 inch between the fulcrum and the point of application of force, and an overall lever length of 3.75 inches; therefore, if a deflection at the point of application of force is .001 inch, the deflection at the free end of the primary lever will be .00375 inch. Superimposing a deflection of .00375 inch on a secondary lever system, arranged with respect to a primary lever as shown in FIGURES 1 and 3, having one free end .75 inch from the axis about which the secondary system rotates, and where the fulcrum is also at the point of rotation, will give a deflection of .01 inch at the opposite free end, which is 2.75 inches from the point of rotation and fulcrum. Therefore, the initial deflection of .001 inch has been amplified to .01 inch at the longest free end of the secondary lever system, from which point an electrical signal may be transmitted to external devices for weight reading purposes, or the like.

In accordance with one particular embodiment of our invention, pin 6 is made of a material having a coefficient of expansion similar to weigh rail 1, so that the final weight indication will not be affected by variations in temperature. That is, during a period of comparatively high temperature the section of rail 1 on opposite sides of the slot may expand to increase the spacing between slot surfaces 2a and 2b. However, such expansion will be accompanied by a similar expansion of pin 6 to prevent any undesirable separation between pin 6 and surface 2a of the slot. With pin 6 held firmly against slot surface 2a it will be obvious that pin 6 will be deflected immediately as railhead 3 is deflected. In contrast to the previous example, any contraction occurring in rail 1 will somewhat reduce the width of the slot and a similar contraction of pin 6 will compensate for this reduction. In both cases, therefore, it will be recognized that ensuing weight impulses transmitted to pin 6 will be unaffected by temperature variations.

With weigh rail 1 and assembly 9 constructed and arranged in the manner described, car wheel 5 will cause railhead 3 to deflect towards lower surface 2b of the slot, in passing over the slot. This deflection will be transmitted through pin 6 in contact with upper surface 2a of the slot to primary lever 7 pivotally connected about the axis of pin 8, causing primary lever 7 to exert a downward force on secondary lever system 18 at 7b and 18k causing the secondary lever system, pivotally connected about the axis of pin 19, to move upward until its plurality of movable contacts 18j make contact with heel springs 26 and fixed contacts 27.

Assuming that wheel 5 is on an empty car (approximately 18 tons), the wheel would exert a 4500 pound load on a rail. Accordingly, if it is desired to have one of a plurality of fixed contacts operate in response to a deflection caused by said car, it would be necessary to adjust the position of associated movable contacts 18j and heel springs 26, by means of introducing shims between the points of contact of movable contacts 18j and heel springs 26, so that a heel spring would make contact with its associated fixed contact 27 in response to deflection of railhead 3.

Similar operations would occur for a medium weight car (approximately 38 tons total; 9500 pounds per wheel) and a heavy weight car (55 tons and over; 13,750 pounds per wheel and over) by providing successive adjustments on the remaining contacts. With such adjustments of the three contacts shown, one set of contacts would close each time a wheel of a light weight car passed over the slot, two sets of contacts would close when a medium weight car passed over the slot, and three sets of contacts would close when a heavy weight car passed over the slot.

The braking apparatus for the car retarder is not shown since it is immaterial just what form such apparatus assumes. It is deemed sufficient for the purposes of this disclosure to show the cooperating fixed and movable contacts and to state that electrical means for controlling the braking apparatus are controlled by these contacts and that braking force will vary in accordance with which pair or pairs of contacts is closed in response to the passage of a car over the railhead. The aforementioned copending application of Falkowski discloses details of a braking system which can be controlled in such manner.

It is to be understood that it is within the scope of our invention to vary the rail slot position, shape and size, and also the shape of the stop member, to obtain the amount of railhead deflection desired.

It is to be further understood that it is within the scope of our invention to use other types of contact assemblies in cooperation with our weigh rail.

Although we have shown and described only one form of a weight responsive means embodying our invention, it is to be understood that various changes and modifications may be made therein, within the scope of the appended claim, without departing from the spirit and scope of our invention.

Having thus described our invention, what we claim is:

In a rail comprising an upper wheel bearing portion and an intermediate portion which extends between said upper portion and the side of the rail opposite said upper wheel bearing portion, said intermediate portion having a slot extending transversely through said intermediate portion from side to side in a plane generally to the wheel bearing surface of said upper portion, the slot having a relatively long dimension disposed longitudinally of the rail, said slot being formed with its upper surface sufficiently close to said upper portion to allow upper portion displacement into said slot in response to the weight of a load applied to the wheel bearing surface of said upper portion, and a stop member located in said slot and provided with a substantially plane upper surface and a concave lower surface and extending substantially the length of said slot, said member having its upper surface engaging the upper surface of said slot so that upon displacement of said upper portion in the one direction due to the weight of a wheel load said stop member assists said upper portion to support such load and thereafter upon the removal of such load assists said upper portion to move in the opposite direction, said member having the lowest portions of its concave surface contacting the lower surface of said slot with the distance between the highest portion of the concave surface and the lower surface of said slot being such that any upper portion displacement will be within the elastic limit of said upper portion.

References Cited in the file of this patent

UNITED STATES PATENTS

| | | |
|---|---|---|
| 1,787,752 | McFarland | Jan. 6, 1931 |
| 2,779,583 | Bone | Jan. 29, 1957 |
| 2,902,595 | Bone | Sept. 1, 1959 |

FOREIGN PATENTS

| | | |
|---|---|---|
| 236,611 | Germany | July 8, 1911 |

UNITED STATES PATENT OFFICE
CERTIFICATE OF CORRECTION

Patent No. 2,987,613

June 6, 1961

Glen V. Jefferson et al.

It is hereby certified that error appears in the above numbered patent requiring correction and that the said Letters Patent should read as corrected below.

Column 6, line 45, after "generally" insert -- parallel --.

Signed and sealed this 24th day of October 1961.

(SEAL)
Attest:

ERNEST W. SWIDER
Attesting Officer

DAVID L. LADD
Commissioner of Patents
USCOMM-DC